(12) United States Patent
Erimli (10) Patent No.: US 6,483,844 B1
(45) Date of Patent: Nov. 19, 2002

(54) APPARATUS AND METHOD FOR SHARING AN EXTERNAL MEMORY BETWEEN MULTIPLE NETWORK SWITCHES

(75) Inventor: Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/311,361

(22) Filed: May 13, 1999

(51) Int. Cl.[7] .............................................. H04L 12/54
(52) U.S. Cl. ...................................... 370/428; 370/386
(58) Field of Search ................................ 370/428, 401, 370/445, 386; 710/316; 711/147, 153

(56) References Cited

U.S. PATENT DOCUMENTS

| | | | | |
|---|---|---|---|---|
| 5,515,376 A | | 5/1996 | Murthy et al. | |
| 5,680,113 A | * | 10/1997 | Allen et al. | 340/825.05 |
| 5,909,564 A | * | 6/1999 | Alexander et al. | |
| 5,949,786 A | * | 9/1999 | Bellenger | 370/401 |
| 6,023,472 A | * | 2/2000 | Kupchik | 370/446 |
| 6,041,065 A | * | 3/2000 | Melvin | 370/492 |
| 6,104,696 A | * | 8/2000 | Kadambi et al. | 370/218 |
| 6,189,040 B1 | * | 2/2001 | Oohara | 709/238 |
| 6,226,290 B1 | * | 5/2001 | Salette | 370/389 |
| 6,240,101 B1 | * | 5/2001 | Co et al. | 370/461 |
| 6,424,621 B1 | * | 7/2002 | Ramaswamy et al. | 370/230 |

* cited by examiner

Primary Examiner—Ken Vanderpuye (57) ABSTRACT

A non-blocking network switch arrangement of plural network switches provides a single, shared external memory for the network switches. Each network switch in the arrangement may write data frames to a respective predetermined portion of the external memory allocated to each switch. When accessing the external memory, each network switch may access any portion of the external memory to transfer data frames to other network stations. Thus, data frames are accessed by each switch in the arrangement directly from the single, shared external memory, thereby eliminating the potential for blocking due to transfer of data frames from the memory of one switch to the memory of another switch.

18 Claims, 7 Drawing Sheets

APPARATUS AND METHOD FOR SHARING AN EXTERNAL MEMORY BETWEEN MULTIPLE NETWORK SWITCHES

BACKGROUND OF THE INVENTION

1. Field of the Invention

The present invention relates to networks and more particularly, to an apparatus and method of storing and controlling network traffic data in a switched network operating according to Ethernet (IEEE 802.3) protocol.

2. Background Art

Switched local area networks use network switches for supplying data frames between network stations or other network nodes, where each network node is connected to a network switch by a media. The switched local area network architecture uses a media access control (MAC) enabling a network interface within each network node and the network switch to access the media. Each network switch stores and forwards data frames received from a transmitter node to a destination node based on header information and the data in the received frames, including a source and destination address. Each network switch uses a respective external memory, such as an SSRAM, to temporarily store data frames as they are passed through the switch. In particular, each network switch stores and fetches data frames in the external memory via an external memory interface.

A difficulty in designing a network switch to be "non-blocking" (i.e., preventing delay in transferring a data packet received at an input switch port), yet with finite memory bandwidth resources, is ensuring that all ports within each network switch have sufficient memory resources allocated from a respective external memory to prevent the delay of data transmission. An external memory interface of an SSRAM memory, for example, has a limited bandwidth based on the number of data bits on the external memory bus (e.g., 16-bit, 32-bit, etc.) and the data rate of the interface. Due to cost considerations, the external memory interface is normally sized to provide "just enough" bandwidth to serve the bandwidth requirements of the network switch ports, including a high bandwidth uplink port. However, if two or more network switches are connected together in a cascade arrangement through expansion ports requiring bandwidth to create a larger switch (e.g., a 24-port switch using two 12-port network switches), bandwidth allocated to the remaining network switch ports becomes reduced and possible blocking behavior may occur if the high bandwidth uplink is retained. A primary cause of this problem is the limited bandwidth of the external memory interface which must now service twice as many ports. Hence, expandability is difficult when connecting two or more switches together while also maintaining a "non-blocking" arrangement, especially in network switches under heavy network traffic conditions.

SUMMARY OF THE INVENTION

There is a need for a non-blocking network switch arrangement that includes connecting two or more switches together without significantly increasing the size of each switch and extensively modifying the switch design. This and other needs are attained by the present invention, where two or more network switches are arranged to access a single external memory through their respective external memory interfaces, thereby eliminating the need to transfer data frames over the expansion ports of the network switches within the arrangement.

According to one aspect of the invention, a non-blocking network switch arrangement includes a plurality of network switches, with each of the plurality of network switches having a data port and an external data memory interface. The external data memory is accessible to all of the plurality of network switches through each network switch's respective external memory interface. In addition, a data bus is connected to each network switch and is configured to exchange data frame pointers between the plurality of network switches.

According to another aspect of the invention, a method of operating two or more network switches in a non-blocking manner with a shared external memory includes a first step of connecting each of the network switches to the external memory. Next, each respective network switch is apportioned a respective portion of the external memory. Data frames written from each network switch to the external memory are written from a particular network switch to its respective portion of the external memory. When data frames need to be transferred from the external memory to a port or ports within one or more of the switches, the data frames may be transferred from any portion of the external memory to any one or more of the network switches.

This and other needs are attained by the present invention, where two or more network switches are arranged to access a single external memory through their respective external memory interfaces, thereby eliminating the need to transfer data frames over the expansion ports of the network switches within the arrangement. Further, the exchange of frame pointers between network switches utilizing the expansion ports, affords two or more network switches the capability to access the shared external memory without significantly increasing the size of each switch and extensively modifying the switch design.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

First, an exemplary switched network arrangement will be discussed to provide an understanding of the particular network switches used in the present invention. Following this discussion will be a detailed description of an arrangement and method according to a preferred embodiment of the present invention comprised of a network switch arrangement utilizing a shared external memory.

Switch Architecture Overview

Figure 1:
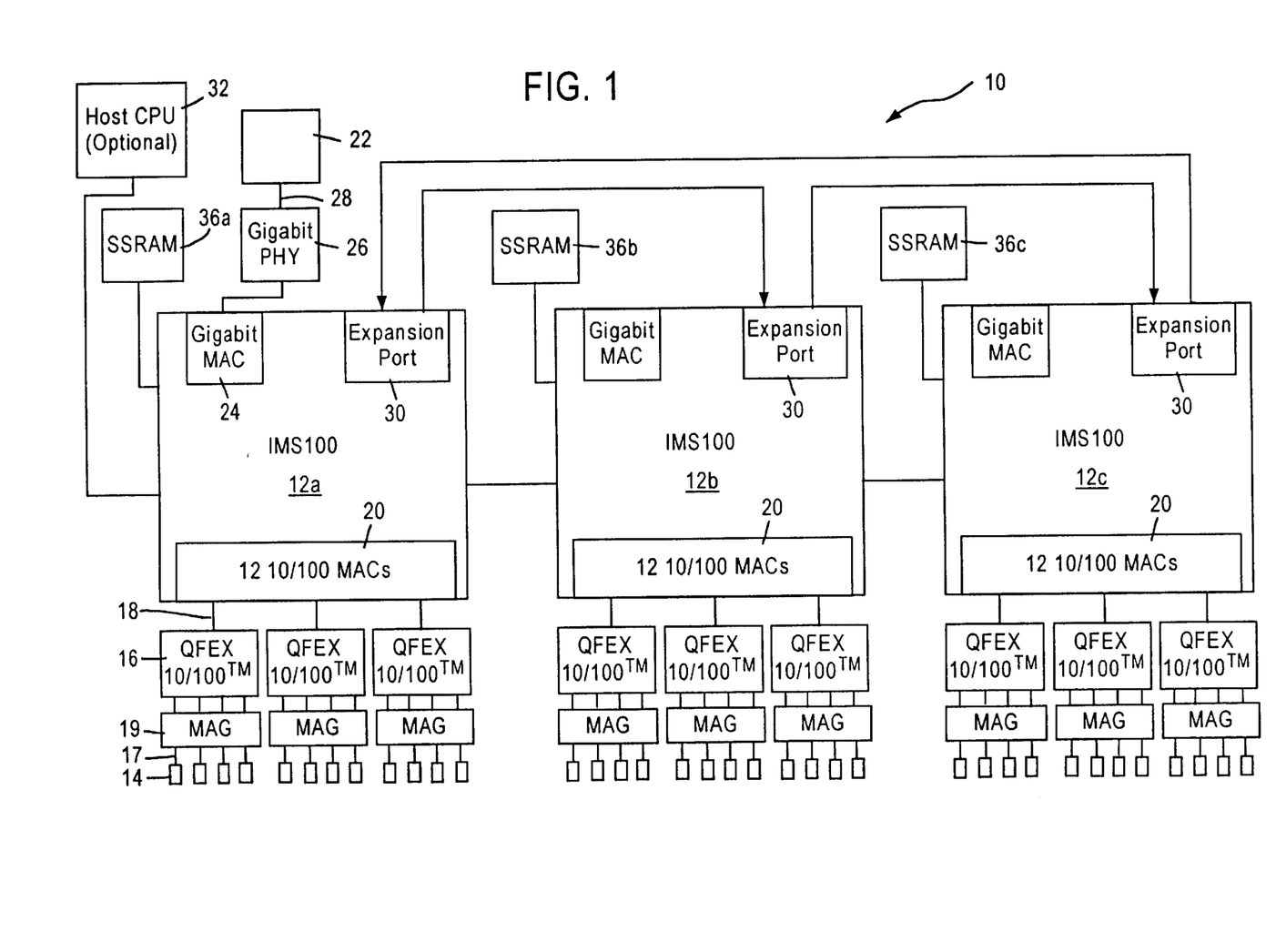
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3 u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3 u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
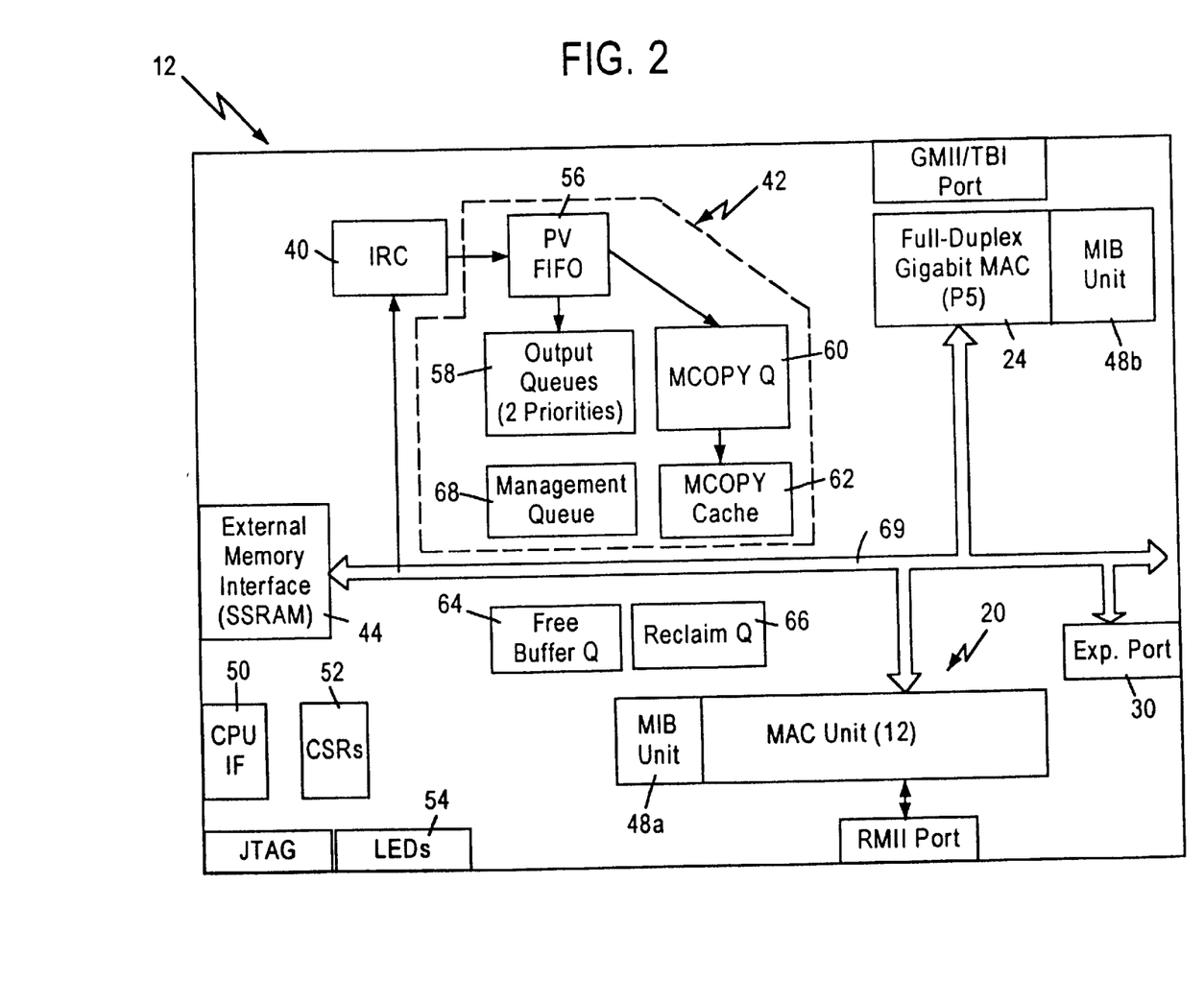
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
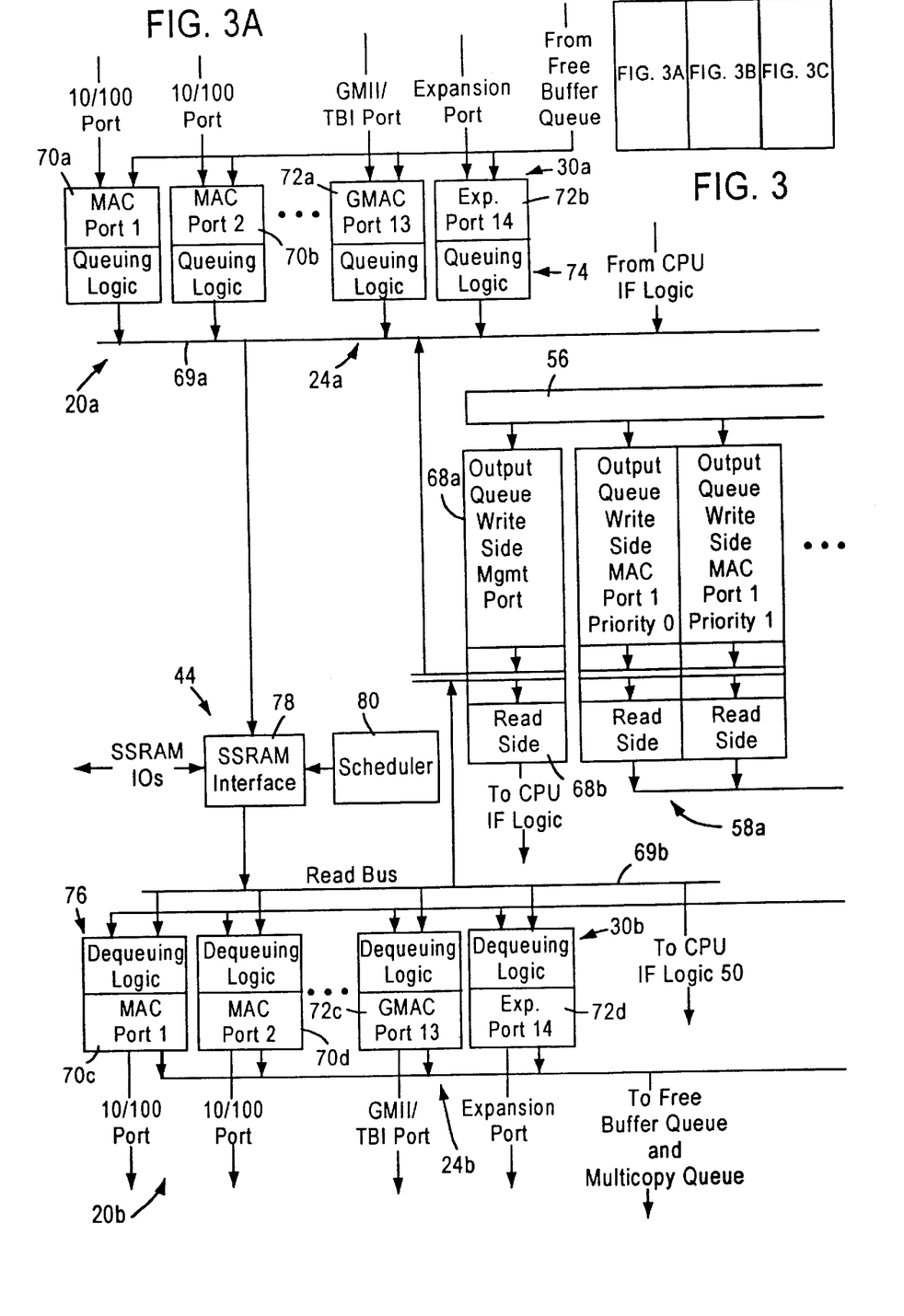
FIG. 3 is a block diagram illustrating in detail the switching subsystem of FIG. 2.
Figure 3B:
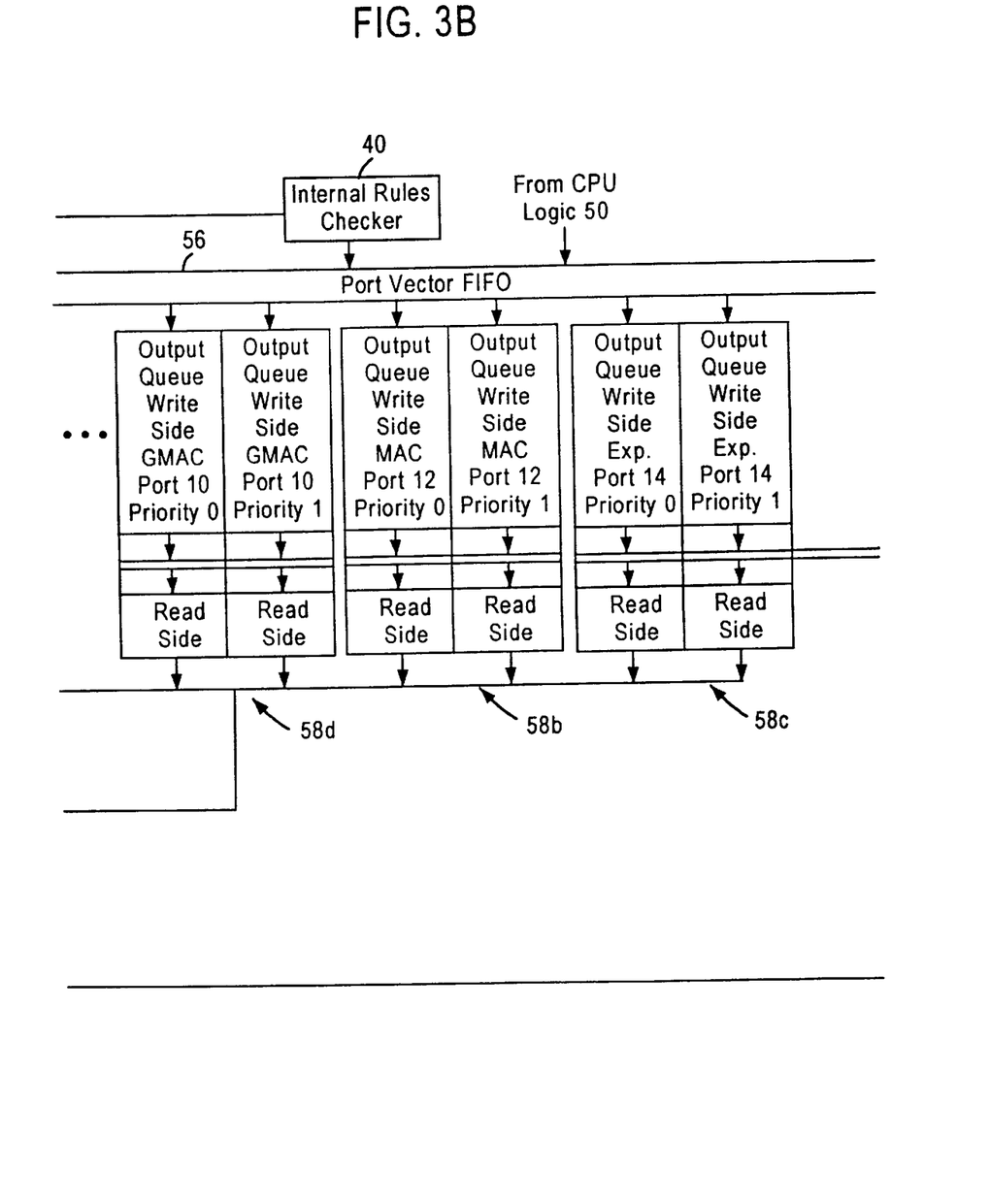
Figure 3C:
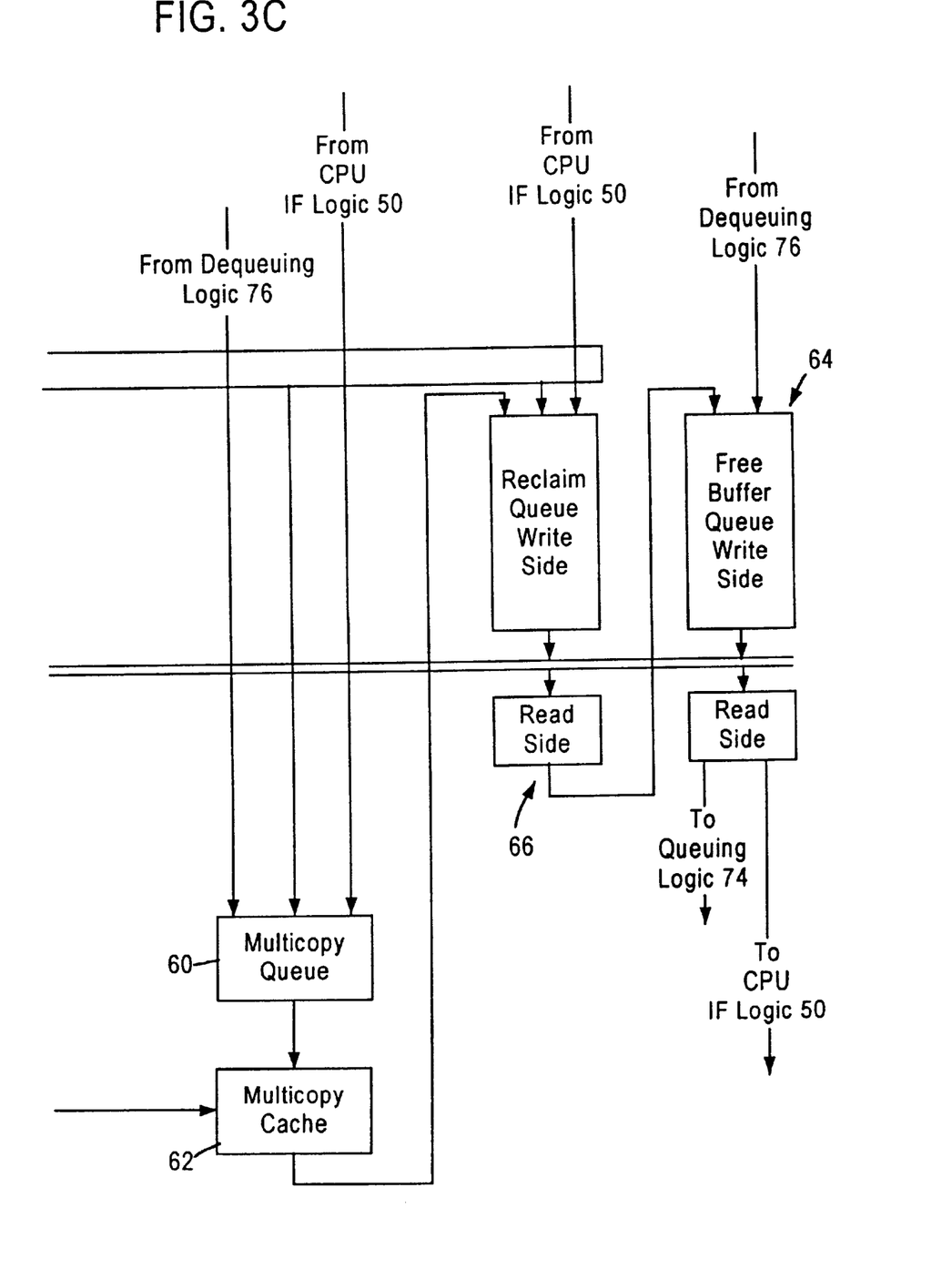

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 arrangement will now be provided. In particular, a detailed description of an arrangement and method according to a preferred embodiment of the present invention comprised of a network switch arrangement utilizing a shared external memory will be provided.

Shared External Memory Arrangement

In an embodiment of the present invention, two network switches are combined together to create a single 24-port switch. In particular, the combined arrangement of two network switches is configured to share a single external memory that is accessed from the external memory interfaces in each respective 12-port switch. This use of a single memory is a modification of the earlier described embodiment of FIG. 1, in which each switch has its own associated memory.

Figure 4:
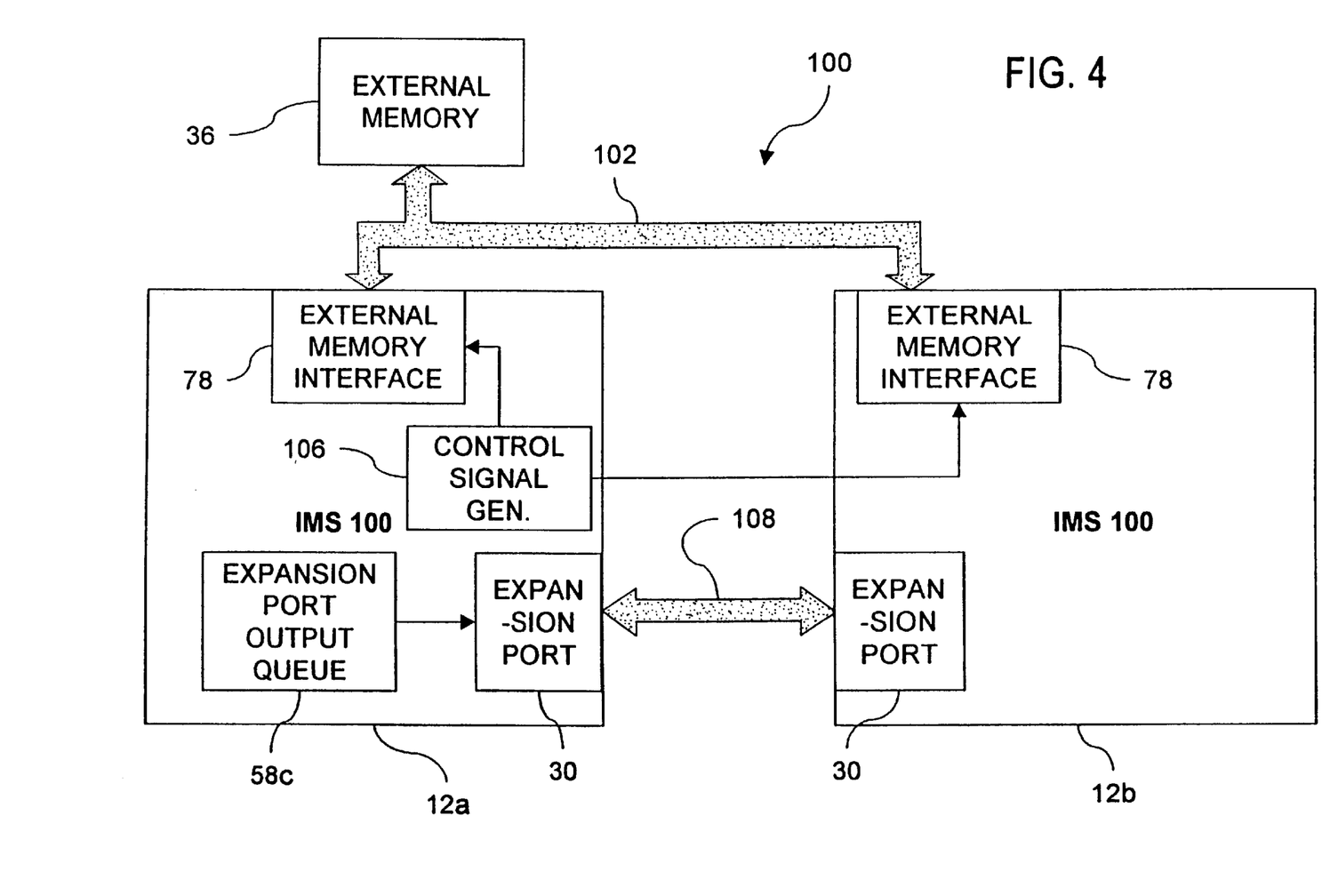
FIG. 4 is a block diagram illustrating in detail an arrangement of two connected network switches according to an embodiment of the present invention.

As shown in FIG. 4, the present embodiment shown generally at 100 includes two 12-port network switches 12*a* and 12*b* that access a single external memory 36. Each network switch 12 accesses the external memory 36 via a respective external memory interface 78 within each network switch and a common data bus 102. In the exemplary network switch arrangement previously discussed with respect to FIGS. 1–3, each network switch accessed a respective external memory through a 64 bit data bus. In the present embodiment, the common data bus 102 has a width of 128 bits to accommodate access from two or more network switches. In addition, the size of the external memory 36 in the exemplary arrangement of FIGS. 1–3 may be 1 megabyte. In the embodiment of FIG. 4, the external memory 36 is sized at 4 megabytes to enable storage of data frames from two or more 12-port network switches 12.

The present embodiment includes a connection bus 108 between the expansion ports 30 of each network switch 12 for the transfer of frame pointers only. Since each of the network switches 12 have direct access to a single external memory 36, the need to transmit frames via the expansion ports 30 is obviated. Thus, when one of the switches (e.g., 12*a*) initiates a transmit function designating the expansion port 30 as a destination, for example, the frame pointer is obtained by the expansion port from the expansion port output queue 58C of the network switch (e.g., 12*a*). The expansion port 30 then sends the frame pointer to the expansion port 30 of the other network switch (e.g., 12*b*). Once the transferred frame pointer has been used by the other network switch 12*b*, the frame pointer is returned in a similar fashion via the expansion ports 30 of the two network switches.

Figure 5:
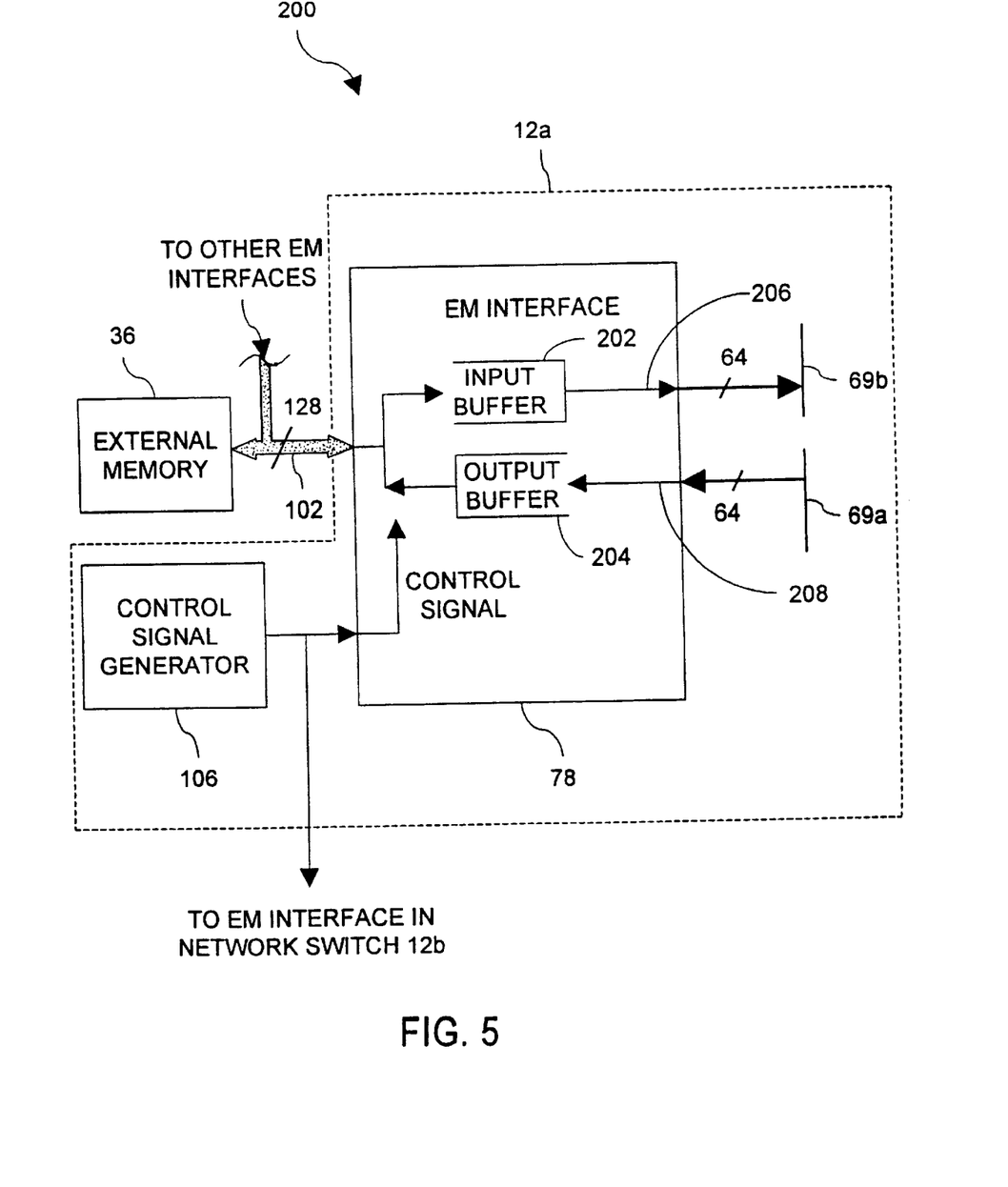
FIG. 5 is a diagram illustrating the external memory interface configuration according to an embodiment of the present invention.

In the embodiment of FIG. 4, each external memory interface 78 is required to time share the external memory 36 with the other external memory interfaces 78 in the other multiple port network switches 12. In order to achieve this time sharing, a control signal is generated by one of the multiple port network switches (e.g., 12*a*) to arbitrate memory access requests from the respective external memory interfaces 78. As shown in FIG. 5, multiple port network switch 12*a* includes a control signal generator 106 for generating the control signal which is delivered to both the external memory interface 78 within network switch 12*a* and to the external memory interface 78 within switch 12*b*. In operation, the control signal is a clock signal. The external memory interfaces 78 are programmed to access the external memory 36 in opposite phases of the clock signal in an interleaving fashion. In an exemplary embodiment, each network switch 12 is programmed to allow interleaving single data frame memory accesses. Alternatively, another embodiment would allow interleaving in a burst of "N" number of data frames delivered to a network switch 12.

In operation, the respective external memory interfaces 78 of each of the network switches 12 write data frames to the single external memory 36 according to a predetermined protocol. Preferably, the embodiment of FIG. 4 apportions the external memory 36 buffers such that the available number of buffers are divided equally between the two network switches 12. In the preferred embodiment, the external memory interface 78 of each of the network switches 12 makes a determination of the data frame storage location within the external memory 36 based upon the value of the most significant bit within the binary encoded buffer frame pointer. However, as will be appreciated by those skilled in the art, the determination of the data frame storage could be accomplished based upon other criteria, such as the least significant bit of the frame pointer or with an additional bit within the frame allowing the external memory interface to address a location within the memory.

When writing data frames to the external memory 36, the external memory interface 78 in each respective network switch 12 is allowed to only write data to its own portion of the external memory 36. On the other hand, since either or both of the network switches 12*a* and 12*b* may be required to forward a particular data frame, the external memory interfaces 78 have the capability of reading data frames from all portions of the external memory 36.

Within each network interface 78, as shown in FIG. 5, an input buffer 202 and an output buffer 204 are included for temporary buffering of data as it passes between the internal data input bus 69*a* and internal data output bus 69*b* via busses 206 and 208 and the external memory 36. The internal busses 69*a*, 206 and 208 are each 64 bit data busses and operate at a clock speed equal to that of the external common 128 bit bus 102 that accesses the external memory 36. Thus, buffering is necessary since the external memory interface 78 is interfacing busses of the same clock speed (i.e., 102, 206 and 208) but of different widths (i.e., a 128 bit bus 102 and 64 bit busses 206 and 208). For example, assuming single accessing interleaving, data is active on the common external bus 102 every other clock cycle of the control signal generator control signal 106. On the other hand, data is active on the internal bus (e.g., 208) every clock cycle. Data must be buffered in output buffer 204 as it arrives from the internal bus 208 every clock cycle so that the 64 bits of data received in the first half of the clock cycle may be combined with the 64 bits received in the second half of the clock cycle to equal 128 bits of data that the external bus 102 is capable of transmitting to the external memory 36 from the external memory interface 78.

As discussed briefly before, the function of the expansion ports 30 in the embodiment of FIG. 4 is to serve only as an interface for the transfer of frame pointers via bus 108. For example, a transmit function sends one or more frame pointers from the expansion port output queue 58*c* of network switch 12*a* to the expansion port 30 of the other network switch 12*b*. After the other network switch 12*b* has utilized the frame pointers to access data frames from the external memory 36 and transmit them via one or more of its network switch ports, the frame pointers are returned to the network switch (12*a*) that "owns" them via bus 108.

In an exemplary embodiment of the present invention, each network switch 12 "owns" a certain number of frame pointers, although each network switch has access to all of the frame pointers. However, those frame pointers belonging to a network switch (e.g., 12*a*) are only temporarily accessed by another "accessing" network switch (e.g., 12*b*) during the time in which the other network switch is transmitting copies of the frame being addressed by the accessed frame pointer. After the accessing network switch (e.g., 12*b*) completes transmission of all copies of the frame, the frame pointer is returned to the owning network switch (e.g., 12*a*) via its expansion port 30.

The above-described access operation first requires that any frame pointer having the expansion port output queue 58*c* as one of the destinations in the port vector received from the internal rules checker 40 is treated as a multicopy transmission, even if it is a unicopy transmission. The frame pointer is placed in the multicopy queue 58*c* of the owning switch (e.g., 12*a*) with the appropriate copy number (even if it is one). Hence, it is not necessary to maintain within the accessing network switch (e.g., 12*b*) the multicopy information from the owning network switch (e.g., 12*a*).

In addition, the access operation also requires that whenever the accessing network switch (e.g., 12b) receives a frame pointer from another network switch (e.g., 12a), the expansion port 30 of the accessing network switch (e.g., 12b) first checks to see if the frame pointer belongs to its own section of the memory. A preferred embodiment employs logic (not shown) within the expansion port 30 that checks the most significant bit of the frame pointer to determine ownership.

If the expansion port 30 determines that the frame pointer belongs to its own section of the memory (i.e., in the case when a frame pointer is returned from the other switch), the expansion port 30 places the frame pointer in its multicopy queue 60 with a copy number of minus one (−1). The frame pointer reclaim function inside the owning network switch (e.g., 12a) then proceeds in a normal operating fashion.

Alternatively, if the expansion port 30 determines that its switch (e.g., accessing switch 12b) is not the owner of a received frame pointer (i.e., it is addressing a frame to be forwarded by the accessing switch), the Expansion port 30 of the accessing switch (e.g., 12b) first reads, via the external memory interface 78, the first 64 bytes of data stored in the external memory location addressed by the frame pointer. The Expansion port 30 then rewrites the data back to the same external memory location so that it may be accessed and transmitted by the ports within the accessing switch (e.g., 12b). Rewriting the first 64 bytes enables the internal rules checker 40 of the accessing switch (e.g., 12b) to determine the destination addressees) for the frame and generate a corresponding forwarding descriptor.

Also, in the accessing network switch (e.g., 12b), when the copy number of a frame pointer reaches zero in its multicopy cache 62, the cache checks the frame pointer before forwarding it for reclaim. Similar to the expansion port 30, the multicopy cache 62 includes logic (not shown) that preferably determines ownership of the frame pointer based on the most significant bit. If the multicopy cache 62 determines that the network switch (e.g., 12b) is not the owning switch, it then forwards the frame pointer to the expansion port 30 to be sent back to the owning network switch (e.g., 12a) via data bus 108.

Finally, the free buffer queue 64 in the accessing switch (e.g., 12b) also checks the frame pointer received from the dequeuing logic 76 or the port vector FIFO 56 in the case of reception from the reclaim queue 66. If the frame pointer belongs to the other network switch (e.g., 12a), the frame pointer is sent to the expansion port 38, instead of being placed in the free buffer queue 64. Once the frame pointers are received by the owning network switch (e.g., 12a) via bus 108, they are sent to the multicopy queue 60 of the owning network switch (e.g., 12a) whose reclaim function proceeds to send the frame pointer back to the free buffer queue 64 of the owning switch (e.g., 12a).

The above described features of the present invention allow multiple switches to access a common memory, thereby eliminating the need to transfer data frames between switches over the expansion ports within the network switches. By eliminating data frame transfer over the expansion ports, the likelihood of blocking in the switches is greatly minimized.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the amended claims.

What is claimed is:

1. A network switch arrangement comprising:
    a plurality of network switches, each of the network switches having at least one data port and an external data memory interface;
    an external memory directly accessible by each of the network switches through each respective external data memory interface; and
    a first bus connected to each network switch, the first bus configured to transfer frame pointers between the plurality of network switches, said frame pointers indicating a memory location of a data frame stored in the external memory.

2. The arrangement of claim 1 further comprising:
    a second bus connected between the data port, of each respective network switch and the external data memory, the second bus configured for transferring data frames between the network switches and the external data memory.

3. The arrangement of claim 1, wherein storage space within the external memory is apportioned between the plurality of network switches.

4. The arrangement of claim 3, wherein the external memory interface in each network switch is configured to write only to a respective portion of the storage space apportioned to that network switch.

5. The arrangement of claim 3, wherein the external memory interface in each network switch is configured to read from any portion of the storage space within the external memory.

6. The arrangement of claim 3, wherein the storage space in the external memory is apportioned between the plurality of network switches according to a value of most significant bits of the frame pointer.

7. The arrangement of claim 1, wherein at least one of the network switches includes a control signal generator that issues a control signal for controlling memory access requests from each respective external memory interface within each of the network switches to the external memory.

8. The arrangement of claim 7, wherein the control signal generator is coupled to each external memory interface within each respective network switch, the control signal causing the interleaving of memory access requests from the external memory interfaces.

9. The arrangement of claim 8, wherein each memory access request is for a single data frame stored within the external memory.

10. The arrangement of claim 8, wherein each memory access request is for a predetermined number of data frames stored within the external memory.

11. The arrangement of claim 1, further comprising:
    each network switch owning a predetermined number of frame pointers; and
    each port having a respective bus port connecting the respective network switch to the first bus, each respective bus port having a logic configured to determine whether a specific frame pointer is owned by the respective network switch.

12. The arrangement of claim 11, wherein each bus port is configured to transfer the specific frame pointer over the first bus if it is not owned by the respective network switch.

13. A method of operating at least two network switches in a non-blocking manner with a shared external memory comprising the steps of:
    directly connecting each of the network switches to the external memory;

apportioning the network switches a respective portion of the external memory;

writing data frames from each of the network switches to the respective portion of the external memory;

transferring data frames from any portion of the external memory to any one of the network switches in response to memory access requests from the network switches;

transmitting data frames over ports in the network switches; and transferring frame pointers between the network switches when more than one network switch transmits copies of the same data frame, the frame pointers addressing specific portions of the external memory.

14. The method according to claim 13, further comprising the step of:

arbitrating the memory access requests from the two or more network switches to the external memory.

15. The method according to claim 14, wherein the step of arbitrating the memory access requests includes providing a control signal for interleaving memory access requests from the two or more network switches.

16. The method according to claim 15, wherein each memory access request is for a single data frame stored within the external memory.

17. The method according to claim 15, wherein each memory access request is for a predetermined number of data frames stored within the external memory.

18. The method according to claim 13, further comprising the steps of:

determining within a particular network switch which of the at least two switches owns a transferred frame pointer;

retaining the transferred frame pointer within a network switch when it is determined that the transferred frame pointer is owned by a particular network switch making the determination;

retransferring the transferred frame pointer to another network switch when it is determined the transferred frame pointer is not owned by the particular network switch making the determination.

* * * * *